(12) United States Patent
Glazer et al.

(10) Patent No.: US 9,986,409 B2
(45) Date of Patent: May 29, 2018

(54) METHOD AND SYSTEM FOR DISCOVERING AND CONNECTING DEVICE FOR STREAMING CONNECTION WITH A COMPUTERIZED COMMUNICATION DEVICE

(71) Applicant: SCREENOVATE TECHNOLOGIES LTD., Ra'anana (IL)

(72) Inventors: Joshua Glazer, Ra'anana (IL); Evgeny Leib, Kfar Saba (IL); Yakir Levi, Tel Aviv (IL)

(73) Assignee: SCREENOVATE TECHNOLOGIES LTD., Ra'anana (IL)

( * ) Notice: Subject to any disclaimer, the term of this patent is extended or adjusted under 35 U.S.C. 154(b) by 16 days.

(21) Appl. No.: 14/838,760

(22) Filed: Aug. 28, 2015

(65) Prior Publication Data

US 2016/0066173 A1    Mar. 3, 2016

Related U.S. Application Data

(60) Provisional application No. 62/042,899, filed on Aug. 28, 2014.

(51) Int. Cl.
| H04W 4/00 | (2018.01) |
| H04W 8/00 | (2009.01) |
| H04W 76/02 | (2009.01) |
| H04W 84/12 | (2009.01) |

(52) U.S. Cl.
CPC ......... *H04W 8/005* (2013.01); *H04W 76/023* (2013.01); *H04W 84/12* (2013.01)

(58) Field of Classification Search
None
See application file for complete search history.

(56) References Cited

U.S. PATENT DOCUMENTS

| 8,255,517 B1* | 8/2012 | Hernacki | H04W 12/08 709/224 |
| 2010/0121949 A1* | 5/2010 | Cho | H04L 41/12 709/224 |
| 2013/0100486 A1* | 4/2013 | Mccoog | G06F 3/1204 358/1.15 |
| 2013/0111039 A1* | 5/2013 | Gomes | H04W 4/023 709/227 |
| 2014/0195968 A1* | 7/2014 | Banavara | G06Q 30/0641 715/810 |

* cited by examiner

*Primary Examiner* — Chi H Pham
*Assistant Examiner* — Fahmida Chowdhury
(74) *Attorney, Agent, or Firm* — Browdy and Neimark, PLLC

(57) ABSTRACT

The present invention provides a method for discovering and connecting available device for streaming connection with a computerized communication device. The method comprising the following steps: maintaining list of potential external device for streaming connectivity by tracking active connections, in accordance with at least one of the following: geographical location or common wireless local network connection, triggering discovery of external devices for streaming based on identified new geographical zone or identified new connection to wireless local network connection, discovering devices for streaming from the determined potential external devices according to triggering and connecting discovered available external devices for streaming

4 Claims, 4 Drawing Sheets

---

Scanning module

310 | Performing discovery process for potential external device

320 | Filter scanned devices according to predefined list of relevant devices or predefined criteria (e.g. device functionality) to identify the active relevant devices 330 | Identifying an active potential external device 340 | Connecting automatically or by verification to an active potential devices

METHOD AND SYSTEM FOR DISCOVERING AND CONNECTING DEVICE FOR STREAMING CONNECTION WITH A COMPUTERIZED COMMUNICATION DEVICE

TECHNICAL FIELD

The present invention relates to network communication discoveries and more particularly, to triggering for discovering and connecting available devices for streaming connection with a computerized communication device.

SUMMARY OF INVENTION

The present invention provides method for discovering and connecting available external devices with a computerized communication device. The method comprising the steps of: maintaining list of potential external devices connectivity by tracking active connections, in association with an identifying parameter of current active wireless local network, triggering a scanning discovery for identifying available external devices, according to the list of the potential external devices, once identifying new available connection to wireless local network and connecting to at least one identified available external device.

According to some embodiments of the present invention the identification parameters include network name.

According to some embodiments of the present invention the identification parameters include geographical location.

According to some embodiments of the present invention the maintaining list include tracking user new connections to external devices and updating list of potential external device in association with identifying parameter of the current connected wireless local network According to some embodiments of the present invention the triggering of a scanning discovery process is initiated when identifying new geographical area and if there are relevant external devices in the list of the potential external devices;

According to some embodiments of the present invention the method further comprising the steps: filtering scanned devices according to predefined criteria or predefined list to get the relevant external device connection data and identifying an active potential external device.

According to some embodiments of the present invention the method further comprising the step update connection history with details of new connected external devices.

The present invention provides a system for discovering and connecting available devices for streaming connection with a computerized communication device. The system comprised of: connection module for connecting discovered available external devices and maintaining updated list of potential external devices for connectivity by tracking active connections, in association with an identifying parameter of wireless local network, triggering module for start scanning discovery of active external devices and scanning discovery module for identifying available external devices, according to the list of the potential external devices in association with identifying parameter of current wireless local network.

According to some embodiments of the present invention the identification parameters includes network name.

According to some embodiments of the present invention the identification parameters includes geographical location.

According to some embodiments of the present invention the maintaining list include tracking user new connections to external device and updating a list of potential external devices by identifying parameter of the current connected wireless local network.

According to some embodiments of the present invention the triggering of a scanning discovery process is initiated when identifying new geographical area and if there are relevant external devices in the list of the potential external devices.

According to some embodiments of the present invention triggering module further filtering scanned devices according to predefined criteria or predefined list to get the relevant external devices and identifies an active potential external device.

According to some embodiments of the present invention the list of potential external device is stored at the memory of the computerized communication device.

According to some embodiments of the present invention the list of potential external device is stored at a communication server enabling to share the list between defined group of users.

These, additional, and/or other aspects and/or advantages of the present invention are: set forth in the detailed description which follows; possibly inferable from the detailed description; and/or learnable by practice of the present invention.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The term "computerized mobile device" as used herein in this application, is defined as a mobile device with capability of running applications as well as streaming multimedia data to a screen that is external to the computerized mobile device (e.g. a mobile phone or a tablet device).

The term "target computerized device" as used herein in this application, is defined as a computerized device (such as a terminal, screen , TV, PC, multimedia device including DVD, stereo, radio etc) with capability to display of provide audio and/or video of streaming multimedia data from a computerized mobile device (e.g. a mobile phone, a tablet device or a laptop).

The term "connection" as used herein in this application, is defined as a wireless connection between computerized mobile device and target device enabling streaming/beaming data between the devices.

Figure 1:
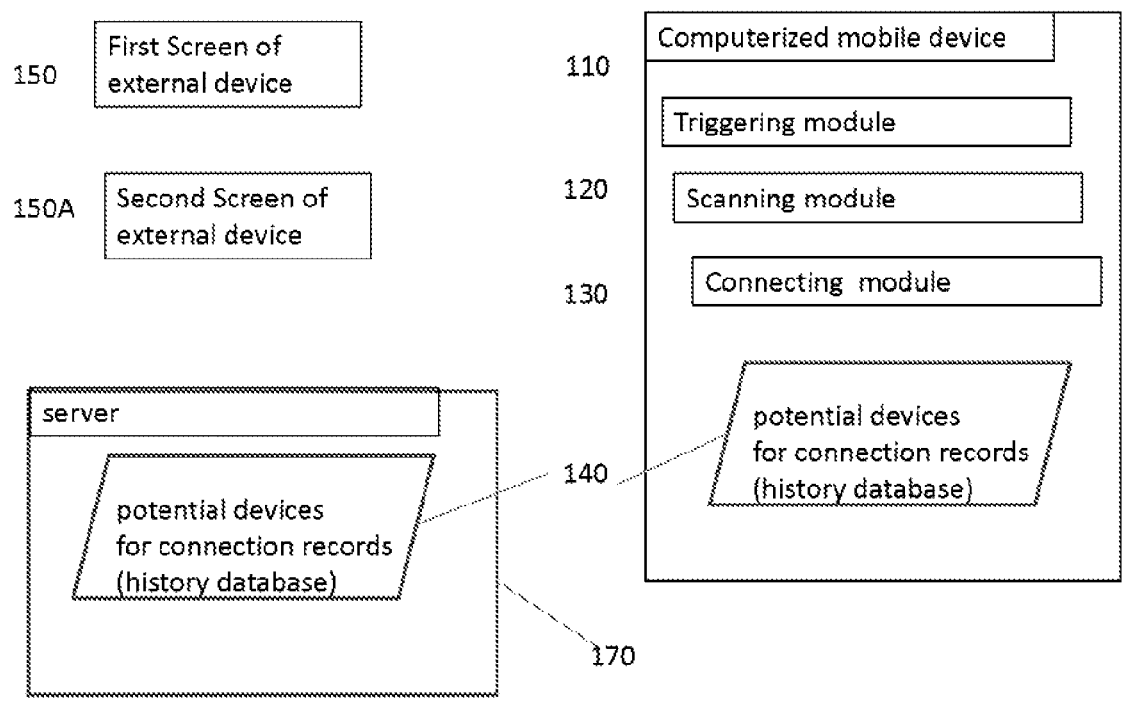
FIG. 1 is a block diagram of the system components and modules, according to some embodiments of the invention.

FIG. 1 is a block diagram of the system components and modules, according to some embodiments of the invention. The Computerized mobile device 100 may connect to one or more target external devices 150,150A through local wireless network such as WIFI. The Computerized mobile device 100 comprises: a triggering module 110 for identifying new location or wireless network for initiating a scanning process, a scanning module 120 for discovering a potential external device for connection through the wireless connection, a connection module 130 for establishing wireless connection based on discovered external devices and updating process of the history database of potential external devices 140.

Figure 2:
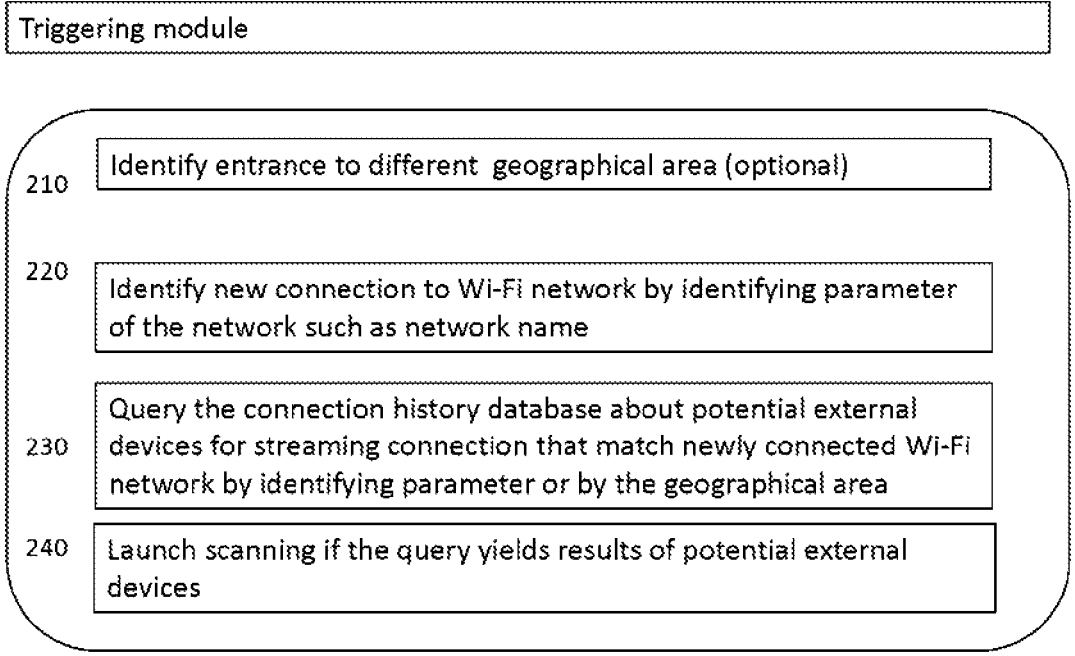
FIG. 2 a flowchart illustrating the triggering module activities, according to some embodiments of the invention.

FIG. 2 a flowchart illustrating the triggering module activities, according to some embodiments of the invention. The triggering module activities include at least one of the following: identifying of new WIFI network connection 220 according to identifying parameter, such as WIFI network name or entrance to different geographical area 210 such as entering a different building. Upon identification of new communication network or different area, the module initiates a query of the connection history database 140 (list of potential external devices) to retrieve potential external devices (such as display devices for streaming, audio device or printing devices) for connection that match the newly connected Wi-Fi network or identified geographical area 230. In case potential external devices for streaming connection are found in the database 140, scanning module is launched 240. The connection history database history 140 may be implemented in the phone memory and/or optionally at external communication server. In case the history database history 140 is further implemented on a server, user of the same organization which shares a WIFI connection can share the database, accordingly new user of the organization can automatically gain information of all available potential external devices.

Figure 3:
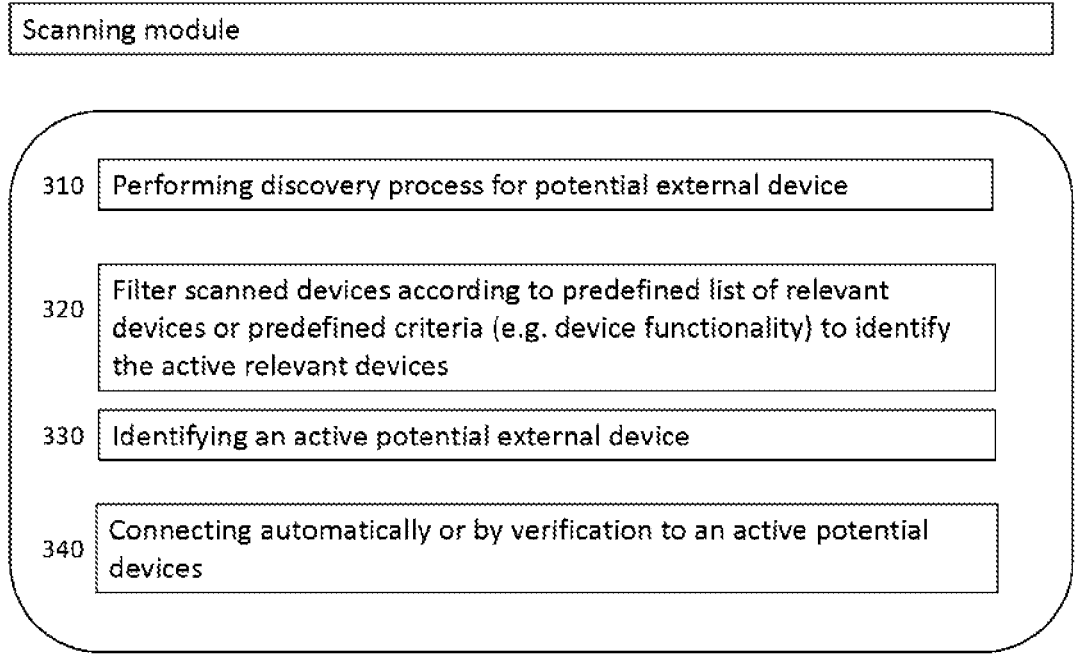
FIG. 3 is a flowchart illustrating the scanning module activities, according to some embodiments of the invention.

FIG. 3 is a flowchart illustrating the scanning module activities, according to some embodiments of the invention. The scanning module activities include at least one or more of the following: Performing discovery process for identifying active potential external device associated with current active WIFU network based on history database 310, filtering scanned devices according to pre-defined criteria (e.g. Functionality such as display, print etc.) or pre-defined list to get the relevant ones (for instance, target devices that have been selected for automatic connection) 320 and Connecting automatically or by verification to at least one identified active external device 330.

Figure 4:
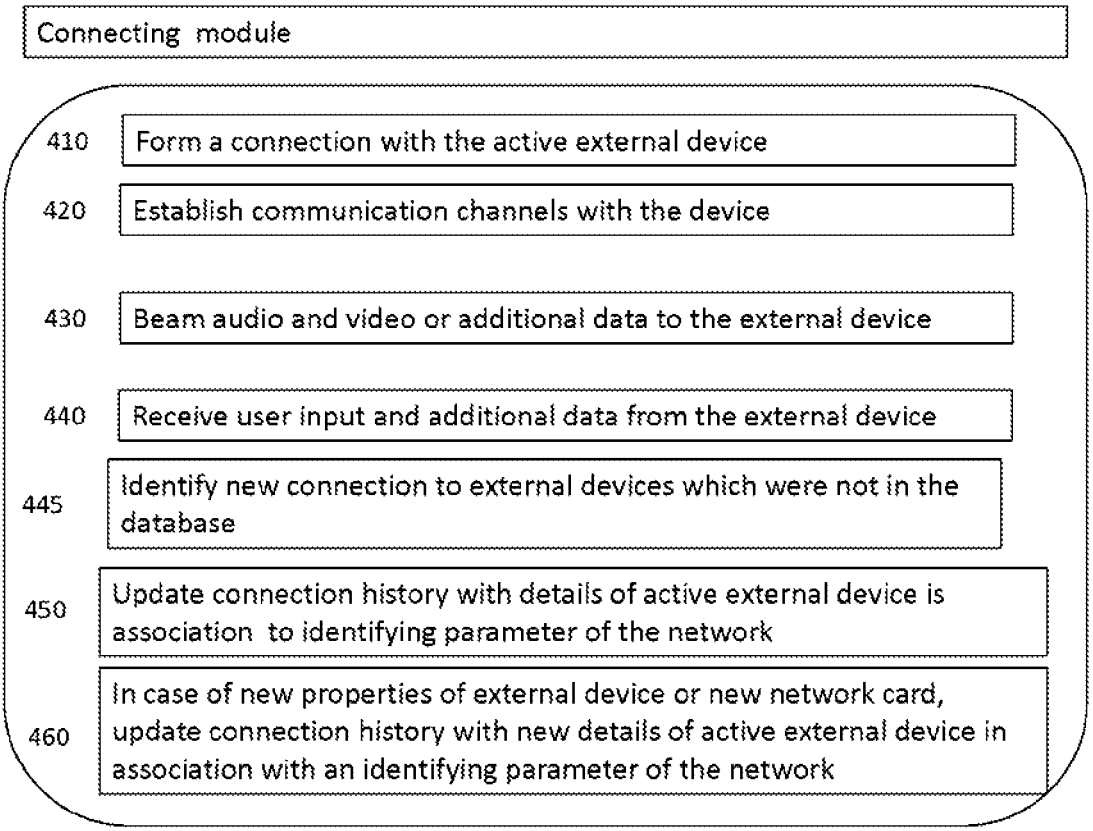
FIG. 4 is a flowchart illustrating the connection module activities, according to some embodiments of the invention.

FIG. 4 is a flowchart illustrating the connection module activities, according to some embodiments of the invention. The connection activities include at least one some of the following: automatically forming a connection with the identified active external device or by verification 410, establishing communication channels with the device 420, optionally beaming audio and video or additional data to the external device 430 (in case of display devices), receive user input and additional data from the external device 440, identify new connections to external devices which were not in the database and update connection history with details of active external device 450 including current location and current Wi-Fi connection.

In case of new properties of external device or new network card new update connection history with new details of active external device in association to identifying parameter of the network (step 460).

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for discovering and connecting available external devices to a computerized communications device, said method implemented by the computerized communications device and comprising the steps of:
   connecting to a Wi-Fi network;
   connecting to an external device having streaming data functionality;
   updating a connection history database with a record of the external device associated with an identification parameter of the Wi-Fi network and with at least one streaming functionality criterion, wherein the criterion is one of a display functionality, an audio functionality, and a printing functionality;
   subsequently, after the computerized communications device is disconnected from the external device, triggering, upon detection of a new available Wi-Fi network or entrance to a new geographic location, a query of the connection history database to determine a list of relevant external devices associated both with the identification parameter of the Wi-Fi network and with a pre-defined functionality criterion;
   wherein the query filters records in the connection history database by both a pre-defined functionality criterion and either identification parameter of the Wi-Fi network or location condition to determine the list of relevant external devices;
   performing a wireless scan for identifying an active external device from the list of relevant external devices; and
   upon identifying the active external device in the wireless scan, reconnecting the computerized communications device to the active external device.

2. The method of claim 1, further comprising tracking new connections of additional external devices and responsively updating the connection history database.

3. A computerized communications device comprising at least one processor and at least one memory storing computer-readable instructions that when executed by the at least one processor cause the computerized communications device to perform:
   connecting to a Wi-Fi network;
   connecting to an external device having streaming data functionality;
   appending to a connection history database a record of the external device associated with an identification parameter of the Wi-Fi network with at least one functionality streaming criterion, wherein the criterion is one of a display functionality, an audio functionality, and a printing functionality;
   subsequently, after the computerized communications device is disconnected from the external device, triggering, upon redetection detection of the a new available Wi-Fi network or entrance to a new geographic location, a query of the connection history database to determine a list of relevant external devices associated both with the identification parameter of the Wi-Fi network and with a pre-defined functionality criterion;
   wherein the query filters records in the connection history database by both a pre-defined functionality criterion and either identification parameter of the Wi-Fi network or location condition to determine the list of relevant external devices;
   performing a wireless scan for identifying an active external device from the list of relevant external devices; and
   upon identifying the active external device in the wireless scan, reconnecting the computerized communications device to the active external device.

4. A system comprising:
   a communications server comprising at least one first processor and at least one memory storing computer-readable instructions that when executed by the at least one first processor cause the communications server to maintain a connection history database including a list of potentially available external devices available on a wireless local network, wherein each potentially available external device on the list is associated both with at least one identification parameter and with at least one functionality criterion; and a computerized communications device comprising at least one second processor and at least one memory storing computer-readable instructions that when executed by the at least one second processor cause the computerized communications device to perform:

connecting to a Wi-Fi network;

connecting to an external device having streaming data functionality;

appending to the connection history database a record of the external device associated with an identification parameter of the Wi-Fi network and with at least one streaming functionality criterion, wherein the criterion is one of a display functionality, an audio functionality, and a printing functionality;

subsequently, after the computerized communications device is disconnected from the external device, triggering, upon redetection detection of the a new available Wi-Fi network or entrance to a new geographic location, a query of the connection history database to determine a list of relevant external devices associated both with the identification parameter of the Wi-Fi network and with a pre-defined functionality criterion;

wherein the query filters records in the connection history database by both a pre-defined functionality criterion and either identification parameter of the Wi-Fi network or location condition to determine the list of relevant external devices;

performing a wireless scan for identifying an active external device from the list of relevant external devices; and upon identifying the active external device in the wireless scan, reconnecting the computerized communications device to the active external device.

\* \* \* \* \*

UNITED STATES PATENT AND TRADEMARK OFFICE
CERTIFICATE OF CORRECTION

PATENT NO. : 9,986,409 B2  
APPLICATION NO. : 14/838760  
DATED : May 29, 2018  
INVENTOR(S) : Joshua Glazer, Evgeny Leib and Yakir Levi Page 1 of 1

It is certified that error appears in the above-identified patent and that said Letters Patent is hereby corrected as shown below:

On the Title Page

Item (60), Column 1, (Related U.S. Application Data), Line 1, delete "62/042,899" and insert -- 62/042,889 --, therefore.

Signed and Sealed this  
Tenth Day of May, 2022

Katherine Kelly Vidal  
*Director of the United States Patent and Trademark Office*